L. B. BENTON.
DEPTH GAGE.
APPLICATION FILED APR. 27, 1907.

931,253.

Patented Aug. 17, 1909.

UNITED STATES PATENT OFFICE.

LINN BOYD BENTON, OF PLAINFIELD, NEW JERSEY, ASSIGNOR TO AMERICAN TYPE FOUNDERS COMPANY, OF JERSEY CITY, NEW JERSEY, A CORPORATION OF NEW JERSEY.

DEPTH-GAGE.

No. 931,253.  Specification of Letters Patent.  Patented Aug. 17, 1909.

Application filed April 27, 1907. Serial No. 370,604.

*To all whom it may concern:*

Be it known that I, LINN BOYD BENTON, of Plainfield, in the county of Union and State of New Jersey, a citizen of the United States, have invented a new and useful Improvement in Depth-Gages, of which the following is a specification.

In fitting or adjusting matrices used in type-founding it is essential that absolute accuracy of dimension exist between the standard matrix and those fitted to it. For this purpose it is necessary that accurate measurements of depth be made from time to time during the fitting of a matrix without in any way defacing either the standard matrix or the matrix which is being fitted.

So far as I know no tool has been devised prior to my invention which combines the essential features above described. My invention is intended to fulfil these requirements and will be understood from the drawings in which—

Figure 1:
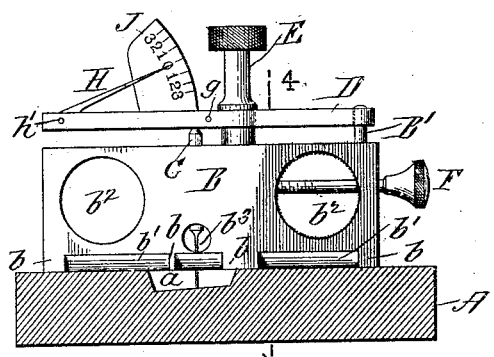
Figure 2:
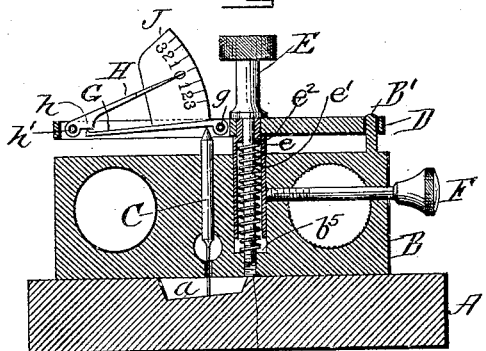
Figure 3:
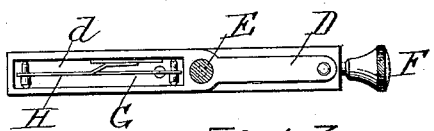
Figure 4:
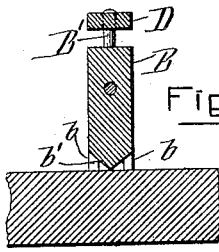

Figure 1 is a side elevation of a depth gage embodying my invention, the matrix shown with it being in section. Fig. 2 is a vertical section of both depth gage and matrix; Fig. 3 a plan, and Fig. 4 a section on line 4—4 of Fig. 1.

A is the matrix, $a$ representing the cavity therein the depth of which is being measured.

The depth gage comprises a body B having feet $b$ and a knife edge $b^1$. It also has an opening $b^2$ milled about its edges by which a firm hold can be taken of the gage by the thumb and finger, so that it may be carefully placed upon the matrix. The portion of the gage which measures the depth of the cavity comprises a slightly weighted needle C both ends of which are pointed, the upper end being preferably weighted and the needle being movable vertically in a suitable guide-way in the body B, this guide-way being so positioned as to maintain the needle in a vertical position and at right angles to a line drawn from center of bearing at $g$ to center of bearing at $h^1$ of the indicating mechanism, also at right angles to the knife edge $b^1$ and to the feet $b$. This guide-way is of proper diameters to conform to the different diameters of the needle and an opening $b^3$ is provided in the body B where the two sections of the guide-way join, the lower edge of this opening providing a shoulder to prevent the needle C falling out of the body.

Above the body and slidable with relation thereto is mounted a frame D having a hole in one end through which passes a guide-pin $B^1$ mounted on the body, and a slot $d$ extending from approximately the middle of the frame toward the other end in which is mounted the indicator mechanism proper as below described. It also has an opening near its middle portion in which is carried an adjusting screw E. The head of the adjusting screw E rests on the frame D and its shank passes down through a cavity $b^5$ in the body B and its lower end screws into an opening $b^4$ which is a narrowing of the cavity $b^5$. A sleeve $e$ forms a lining to the cavity $b^5$, the upper end of the sleeve, surrounding the neck of the screw E, and setting into the opening in the frame D for this purpose. Between the sleeve and the screw E is a spring the lower end of which rests on the bottom of the cavity $b^5$, its upper end resting against the abutment $e^2$ formed by the under side of the neck of the sleeve. By means of the adjusting screw E and spring $e^1$ the relation of the frame and body are adjusted as below described. A clamp screw F passes through the end of the body and engages the side of the sleeve $e$ clamping it and the parts attached to it when the gage has been suitably adjusted.

The upper end of the needle C engages and supports a lever G which is pivoted at $g$ in the indicator frame, the free end of this lever engaging and supporting the pointer H pivoted at $h^1$. For this purpose the pointer preferably has a straight surface $h$ which rests on the end of the lever G and this arrangement is such that, owing to the position of the pivots $g$ and $h^1$, the pointer will be brought to indicate a particular degree upon a scale J which may be considered the zero point. This scale not only has its zero, but has indications 1, 2 and 3 on either side of the zero mark, and these degrees may be indicated in fractions of measurement. For example,—in the apparatus shown these numerals are intended to represent 1/1000 of an inch, the arrangement of the parts being such that when the apparatus is set at zero any variation in the depth of the opening in the matrix up to 1/1000 of an inch will be indicated by a movement of the pointer H from zero toward 1, the shallowing of the cavity moving the pointer upward and the deepening of the cavity allowing the pointer to fall downward.

To set the gage to a standard depth the set screw F is turned to release the sleeve $e$. The adjusting screw is turned so as to raise or lower the indicator frame D until the pointer H points at O on the scale J. The pivots $g$ and $h^1$ and the surface $h$ of the pointer H will then be in the same straight line with the top of the needle C. By moving the gage about on the surface of the matrix the pointer will indicate irregularities in the lower surface of the cavity.

In preparing matrices the first step is to insure the parallelism of the face with the upper surface. That having been accomplished, the gage is set upon the standard matrix, then by removing it to the matrix which is to be fitted a comparison may be made therewith from time to time and the actual amount of cutting to be done will be indicated by the pointer H upon the scale J.

It will be noted that the degrees marked upon the scale grow smaller the farther they are from zero. This is because of the relations of the lever and pointer to each other in the form of my invention shown.

While I prefer to rest a surface of the pointer on the end of the lever, I do not limit my invention to this means for operating the pointer by the lever, nor do I mean to limit my invention to a gage which shall indicate thousandths of an inch for it is evident that by a change in the leverage other fractions or units may be indicated.

I have shown the bottom edge of the body as a knife edge $b^1$ provided with feet $b$, this being a construction which lends itself very easily to regrinding in case the edge becomes dull.

Among the advantages of this gage are the facts that the weight upon the needle is very slight and uniform so that the needle is in no danger of scratching or otherwise damaging the bottom face of the cavity in the matrix in a manner tending to destroy accuracy of measurement and that the device may be easily taken apart to be cleaned. A more important advantage in my gage lies in its ability to measure accurately, within predetermined limits, any irregularity in the depth of the matrix, so that the personal equation of the artisan is eliminated, this measurement being made by means of the pointer and scale by which the amount to be taken off is indicated. In predetermining the sensitiveness of the gage the construction may be such that each interval on the scale J may indicate .0001", .001" or other intervals. In previous height gages for use in fitting matrices, so far as I am aware, the artisan was obliged to judge by his eye the irregularities in the face of the matrix, such irregularities being indicated by a band of light which appeared either between two parts of the gage or between some part of the gage and the upper surface of the matrix, variations between different parts of the face of the matrix being indicated by the varying widths of this band or its entire absence. The practical advantage of my gage in this respect will be at once perceived as it is intended to measure irregularities say .003" in either direction from the standard depth and thus indicate positively to the artisan what is to be done. The indicator mechanism which I have shown therefore differs radically from anything in the art so far as I know.

What I claim as my invention is:—

1. A depth gage comprising a body, a needle movable therein, an indicator frame slidably mounted in said body, a lever mounted in said frame adapted to rest on and be moved by said needle, a scale and a pointer also mounted in said frame, adapted to be moved by said lever distances indicated by said scale, as set forth.

2. A depth gage comprising a body, a needle movable therein, an indicator frame slidably mounted in said body and carrying indicator mechanism comprising a movable member resting on and operated by said needle and a pointer mechanism operated by said lever, and means for adjusting the relative positions of said needle and said pointer, as described.

3. A depth gage comprising a body, a needle movable therein, an indicator frame slidably mounted on said body, means for adjusting the position of said frame toward and from said body, and an indicating means mounted on said frame and adapted to rest on said needle and be moved thereby, as described.

4. A depth gage comprising a body, a needle movable therein, an indicator frame slidably mounted on said body, means for adjusting the position of said frame toward and from said body, means for clamping said adjusting means, and an indicating means mounted on said frame and adapted to rest on said needle and be moved thereby, as described.

5. A depth gage comprising a body, a needle movable therein, a frame carrying indicating means slidably mounted on said body, and means comprising a spring and a screw adapted to adjust the distance between said frame and said body, as described.

6. In a depth gage, a body, a needle freely mounted therein, having its lower end exposed to engagement with the surface the depth of which is to be measured, an indicator frame mounted on said body, and adjustable with relation thereto, a lever pivotally mounted in said frame to rest on said needle, and a pointer also pivotally mounted in said frame in engagement with said lever whereby the movement of said lever will cause a corresponding movement of said pointer.

7. In a depth gage, a body, a needle freely mounted therein, having its lower end exposed to engagement with the surface the depth of which is to be measured, an indicator frame mounted on said body, and adjustable with relation thereto, a lever pivotally mounted in said frame to rest on said needle, and a pointer also pivotally mounted in said frame in engagement with the end of said lever whereby a slight movement of said lever will cause a magnified movement of said pointer, as set forth.

8. In a depth gage, a body, a needle slidably mounted therein, an indicator frame mounted on said body, a lever pivotally mounted in said frame to rest on said needle, and a pointer also pivotally mounted in said frame near the free end of said lever, and a scale located near the end of said pointer, said needle, said lever, said pointer and said scale being arranged as described, whereby when said pointer indicates zero on said scale the top bearing of said needle point of contact between said lever and said pointer will be in line with the pivots of said lever and pointer, as described.

9. A depth gage comprising a body, a needle movable therein, a frame carrying an indicating means adjustably mounted on said body, and means whereby an adjustment of said frame in relation to said body may be effected, said means comprising a cavity in said body the bottom part of which is adapted to receive a screw, a screw dependent from said frame and loosely mounted therein, a threaded hole in the bottom of the said cavity into which said screw is adapted to fit, a sleeve for said cavity mounted upon and dependent from said frame, a spring within said cavity adapted to exert an upward pressure on said frame, and a clamp screw contacting with said sleeve whereby it may be held in any desired position, as described.

10. The depth gage above described comprising a body carrying means to indicate the depth of the cavity to be measured, the supporting face of said body having a knife edge running longitudinally thereof and forming a straight edge whereby the smoothness of the surface upon which the gage stands may be tested, and having feet located outside the line of said knife edge whereby said body may be supported on the surface of the work and the knife edge utilized in the manner described without interference.

LINN BOYD BENTON.

In the presence of—
JOHN T. MURPHY,
ROBERT W. NELSON.